United States Patent [19]
Shang

[11] Patent Number: 5,032,001
[45] Date of Patent: Jul. 16, 1991

[54] OPTICAL FIBER HAVING ENHANCED BEND RESISTANCE

[75] Inventor: Hen-Tai Shang, Norcross, Ga.

[73] Assignee: AT&T Bell Laboratories, Murray Hill, N.J.

[21] Appl. No.: 493,059

[22] Filed: Mar. 9, 1990

[51] Int. Cl.$^5$ .............................................. G02B 6/22
[52] U.S. Cl. ............................. 350/96.33; 350/96.30
[58] Field of Search ............... 350/96.29, 96.30, 96.31, 350/96.33, 96.34

[56] References Cited

U.S. PATENT DOCUMENTS

| | | | |
|---|---|---|---|
| 4,435,040 | 3/1984 | Cohen et al. | 350/96.33 |
| 4,641,917 | 2/1987 | Glodis et al. | 350/96.33 |
| 4,691,990 | 9/1987 | Cohen et al. | 350/96.33 |
| 4,715,679 | 12/1987 | Bhagavatula | 350/96.33 |
| 4,770,492 | 9/1988 | Levin et al. | 350/96.29 |
| 4,836,640 | 6/1989 | Gartside, III et al. | 350/96.23 |
| 4,838,643 | 6/1989 | Hodges et al. | 350/96.33 |

Primary Examiner—John D. Lee
Attorney, Agent, or Firm—E. W. Somers

[57] ABSTRACT

An optical fiber (22) of this invention is suitable for use in tethered vehicle. The optical fiber has a W-shaped refractive index configuration and is characterized by a $\Delta$ of at least 0.9% and a cutoff wavelength of less than 1500 nm. Further, the refractive index configuration is such that a core (30) is characterized by a relatively high value of $\Delta^+$. The value of $\Delta^+$ is at least 0.6% for a single window of operation, whereas for a dual window it is 0.9%. Also, the refractive index configuration of the optical fiber is characterized by a depressed inner cladding portion (32) which has a $\Delta^-$ of 0.3% and an outer radius about equal to the product of 2.5 and the radius of the core.

16 Claims, 4 Drawing Sheets

OPTICAL FIBER HAVING ENHANCED BEND RESISTANCE

TECHNICAL FIELD

This invention relates to an optical fiber having enhanced bend resistance. More particularly, it relates to an optical fiber which has a W-shaped index of refraction configuration and which is suited for use in tethered vehicles.

BACKGROUND OF THE INVENTION

After only a somewhat recent introduction, optical fiber has had a meteoric rise as the predominant means of transmission media in voice and data communications. Optical fiber is manufactured by drawing glass fiber from an optical glass preform which is made by any of several well known processes. Afterwards, or as part of a tandem process, the drawn fiber is coated, cured, measured and taken up, desirably in an automatic takeup apparatus, on a spool to provide a package.

Typically, an optical glass fiber has a diameter on the order of 125 microns, for example, and is covered with a coating material which increases the outer diameter of the coated fiber to about 250 microns, for example. For single mode use, the glass fiber includes a core having a diameter of about 6.2 microns and a cladding system having a diameter of about 125 microns. The cladding system comprises inner and outer claddings. At least the outer portion of the cladding system is the precursor tube in which have been deposited materials to provide the core and the inner cladding when the tube is collapsed to form a preform.

An optical fiber package is used in operations such as ribboning, cabling, and rewinding and is used to ship optical fiber to other companies which further process the fiber. The optical fiber typically is used in voice and data communications systems, both commercial and military. For example, the package may be used in weapons systems in which it is used for guidance and for data communications. Such uses include communication lines between aircraft, between an aircraft and a ship, and between a projectile, such as a missile, and a control station at a launch site, for example. Optical fiber provides the advantages of increased data bandwidth, reduced weight and greater range than wire-guided systems of the prior art.

A typical optical fiber application in a weapons systems involves the packaging of a continuous length of optical fiber on a bobbin which is positioned inside a vehicle. Such a vehicle commonly is referred to as a tethered vehicle. In that application, optical fiber is payed out from a bobbin in the tethered vehicle. One end of the fiber is attached to operational devices in the vehicle, whereas the other end of the fiber is connected to a control or communications station at a launch site. During and after launch, two-way communication with the vehicle is conducted.

There are, however, certain disadvantages, not present in other forms of communication, in using optical fiber. Optical fiber is less robust than metallic conductors, rendering it subject to breakage. Aside from breakage, optical fiber communication performance may be degraded by microbends, which are totally determined by mode field radius, and macrobends in the fiber which are generated by bending or by other stresses to which the fiber may be subjected. Such damage to an optical fiber not only reduces the long-term durability of the fiber, but also causes losses in the strength and in the content of the optical signal. Likewise, physical or optical integrity may be affected adversely by any sharp bends which are experienced as the fiber pays out at immensely high speeds from its packaged configuration. In this usage, the fiber undergoes severe bending. In fact the bending radius may be on the order of a few millimeters. What is needed is an optical fiber that is resistant to small bends. Prior art single mode fiber normally has not been sufficiently bend resistant for deployment in tethered vehicles.

In order to overcome this problem, some have tried the use of dispersion shifted optical fiber, and more particularly, a dispersion flattened fiber. However, such design optical fibers are too bend sensitive and allow optical power to come out into the cladding.

The most predictable loss in a tethered vehicle link is the loss caused by the small radius bend during payout. Accordingly, what is sought after is a fiber in which the small radius bending loss is minimized while initial loss is held to a minimum. Also chromatic dispersion should not be a limiting factor for the system which is sought with suitable laser diode transmitters.

Other than optical requirements, high strength and tight dimensional control are important. Also, inasmuch as long lengths are required, it becomes important that the sought after fiber should be easily manufactured from a large preform.

What is sought after and what seemingly is not available in the prior art is an optical fiber which is suitable for use in tethered vehicle applications. It should be one which is easily manufacturable and which provides acceptable optical and mechanical performance notwithstanding its subjection to severe bending during payout.

SUMMARY OF THE INVENTION

The foregoing problems of the prior art have been overcome by the optical fiber of this invention an object of which is to inhibit macrobending. The optical fiber of this invention has a relatively large mode field radius but is effective in reducing loss in macrobending.

An optical fiber of this invention has a circular shaped cross section transverse to its longitudinal axis and includes a doped core and a cladding system adjacent to the core. The cladding system includes an inner cladding and a first outer cladding. A second outer cladding is provided by a precursor silica tube in which materials have been deposited and which form the core and the inner cladding when the preform tube is collapsed to provide a preform from which the optical fiber is drawn. A refractive index profile of the core and the cladding system has a W-shaped configuration with a $\Delta$ which is the difference between the indices of refraction of the core and of a depressed inner cladding thereof expressed as a percentage of the index of refraction of the tube being at least 0.9% and a cutoff wavelength of less than 1500 nm.

In a preferred embodiment, the optical fiber includes a germanium doped core having a $\Delta^+$ which is the difference between the index of refraction of the core and the index of refraction of a precursor tube expressed as a percentage of the index of refraction of the precursor tube of at least 0.6%. Also, the optical fiber includes a cladding adjacent to the core being down doped and having an inner depressed portion thereof having a difference between the index of refraction of the precursor tube and the index of refraction of the depressed inner cladding expressed as a percentage of the index of refraction of the precursor tube ($\Delta^-$) being about 0.3%. The outer diameter of the inner depressed cladding portion is in the range of about the product of two to four and the diameter of the core. The first outer cladding has an index which is within about 0.1% of the refractive index of the precursor silica tube from which the fiber is drawn.

For a dual window of operation, the germanium doped core has a $\Delta^+$ of 0.9%. On the other hand for a single window of operation of 1550 nm, the $\Delta^+$ which characterizes the core is 0.6%.

BRIEF DESCRIPTION OF THE DRAWING

Other features of the present invention will be more readily understood from the following detailed description of specific embodiments thereof when read in conjunction with the accompanying drawings, in which.

DETAILED DESCRIPTION

Figure 1:
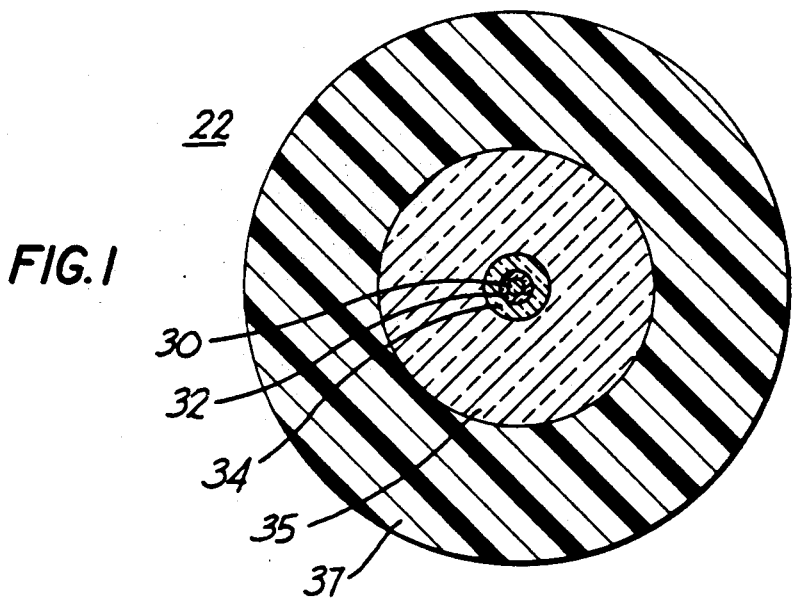
FIG. 1 is an end view cross section of an optical fiber of this invention.
Figure 2:
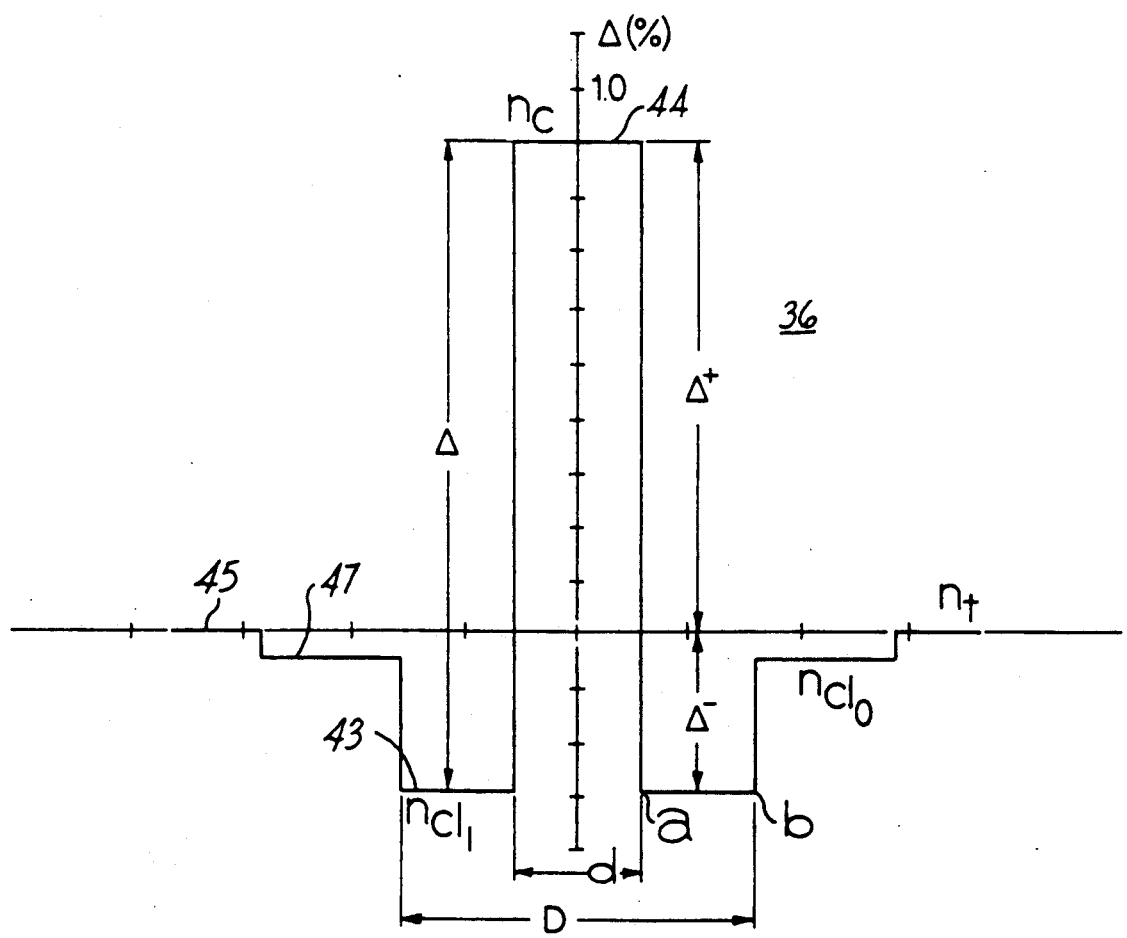
FIG. 2 is a profile representation of a W-shaped refractive index configuration which characterizes the optical fiber of this invention.
Figure 3:
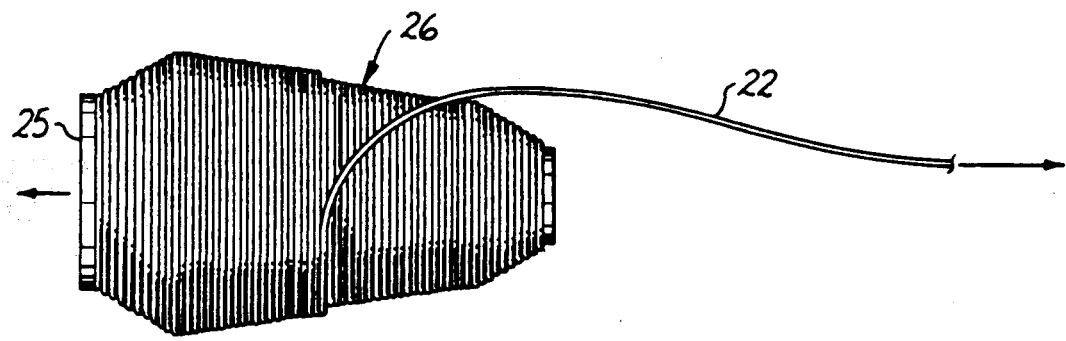
FIG. 3 is an elevational view of a bobbin which holds a plurality of convolutions of optical fiber of this invention and which is suited for use in tethered vehicles.
Figure 4:
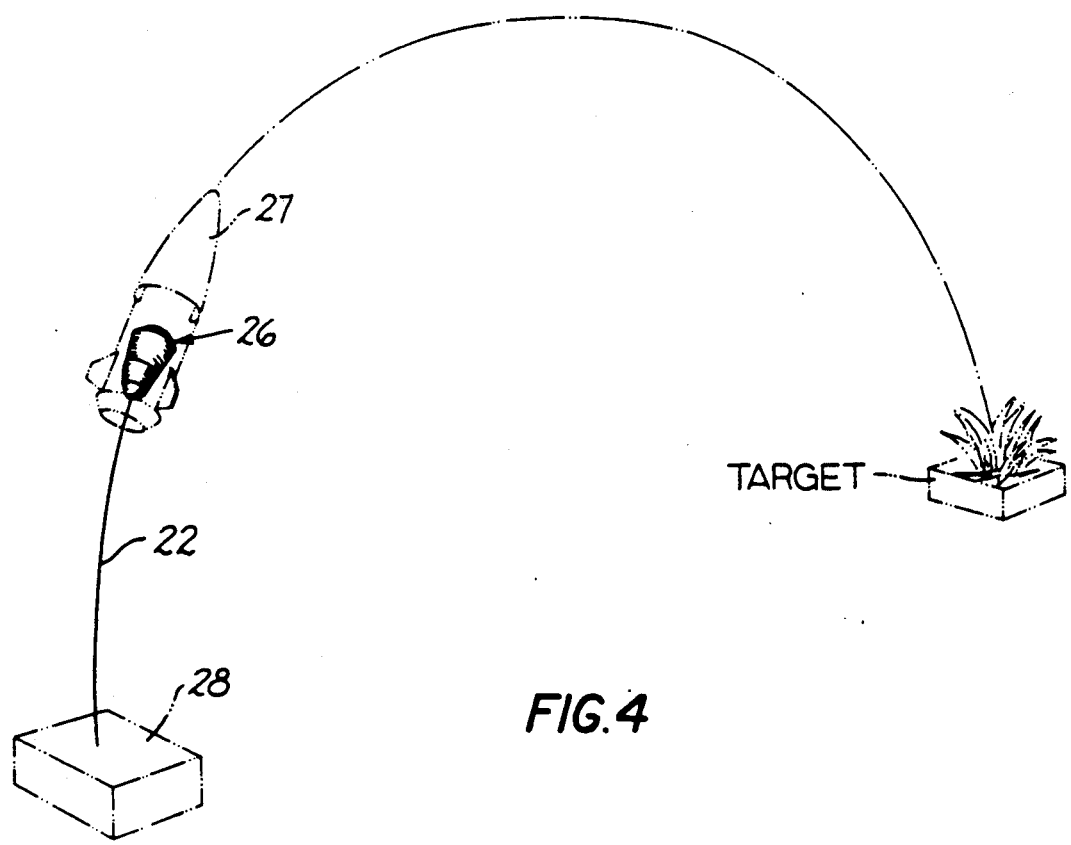
FIG. 4 is a schematic view which shows the deployment of a package of fiber of FIG. 3 in a tethered vehicle along with a typical trajectory.

Referring now to FIG. 1, there is shown a single mode optical fiber 22 of this invention. The optical fiber 22 of this invention which is characterized by a W-shaped refractive index configuration shown in FIG. 2 is suitable for winding on a bobbin 25 for use in a tethered vehicle (see FIG. 3). As can be seen in FIG. 4, a package 26 of the optical fiber 22 is mounted in a vehicle 27. An end of the optical fiber is connected to ground control equipment 28. As the vehicle enters an in-flight pattern, the optical fiber is payed out from the package 26. In this way, the ground control equipment is used to control the flight pattern of the vehicle.

The optical fiber 22 has been made by depositing glassy material within a silica precursor tube. The silica precursor tube is characterized by an index of refraction, $n_t$ (see FIG. 2). Following deposition, the tube is collapsed and fiber is drawn therefrom. Referring again to FIG. 1, it can be seen that the optical fiber 22 includes an optical glass portion comprising a core 30, an inner cladding 32 having an index of refraction, $n_{cli}$, which is depressed (see FIG. 2) from that of the precursor tube, a first outer cladding 34 having an index of refraction $n_{clo}$ and an outer cladding 35 which is provided by the collapsed precurosr tube and which is referred to as the outer tube cladding or second outer cladding. The optical glass portion is enclosed in a coating system 37 comprising one or more layers of coating materials.

In a preferred embodiment, the core 30 has a diameter of about 6.2 microns, the inner depressed cladding 32 has an outer diameter of about 15.5 microns and the first outer cladding has an outer diameter of about 31 microns. As mentioned earlier, the second outer tube cladding has an outer diameter of 125 microns. The outer diameter of the coating system typically is about 250 microns.

Because the most unpredictable loss in a tethered vehicle link is the loss caused by the small radius bend during a payout operation, the optical fiber 22 to be used as a tethered vehicle fiber (TVF) should be characterized by minimal small radius bending loss while being capable of causing the increase in initial loss to a be held to a minimum at the same time single mode operation needs to be maintained. This could be accomplished by containing the fundamental mode without containing the second order mode.

Small perturbations in the axis of an optical fiber which are referred to as microbends can cause optical loss by allowing power to escape through the cladding. The degree of confinement of the optical power and thus the susceptibility to microbending-induced optical loss can be characterized by the spot size, also referred to as the mode field diameter, and the effective index of the fundamental propagating mode. These parameters are well known in the art. Critical parameters which affect microbending and macrobending loss are the diameter, d, of the core and the difference in the indices of refraction, $n_C$ and $n_{cli}$, of the core and the inner cladding, respectively. This difference generally is expressed as a percentage difference of the index of refraction of precursor tube, $n_t$, and is designated $\Delta$. See for example, a representation 36 of the index of refraction profile of a typical single mode optical fiber as shown in FIG. 2. Parameters d, the diameter of the core 30, and $\Delta$, determine, at a given wavelength, the spot size and the effective index. A small spot size and high effective index assure tight confinement of the optical power to the region of the fiber core and thus high resistance to microbending and macrobending induced loss.

Although improved microbending and macrobending performance can be obtained by increasing $\Delta$ and decreasing d, leading to a reduced spot size, it is known that the difficulty of achieving low fiber splice loss increases as the spot size decreases. Further, the wavelength of zero dispersion increases as the core diameter decreases. As the zero dispersion wavelength moves above the operating wavelength, the fiber dispersion increases and the maximum bandwidth at the operating wavelength decreases. These adverse effects, increasing fiber splice loss and increasing fiber dispersion, limit the minimum fiber core size for optical operation at 1.3 $\mu$m.

The dependence of the spot size and zero dispersion wavelength on $\Delta$ is less pronounced. For example, an optical fiber having a relatively high $\Delta$ may be used to provide macrobending resistance, while maintaining a spot size which is suitable for low loss splicing. However, increasing $\Delta$ to improve the macrobending performance will increase the cutoff wavelength, $\lambda_c$, of the fiber. As is well known, the cutoff wavelength is that wavelength below which higher order modes may be propagated. Inasmuch as the bandwidth of the fiber is drastically reduced if higher order modes are present, any increase in cutoff wavelength must be controlled to preserve single mode operation at the system wavelength. If $\lambda_c$ is higher, the optical fiber is more bend resistant and most power is concentrated in the core.

The problem of the preservation of single mode operation and the problem of resistance to macrobending are solved by the so-called modified W optical fiber of this invention which has been found to be ideally suited for use in tethered vehicles.

The optical fiber of this invention is characterized by an inner cladding 32 (see FIG. 1) having an index of refraction which is depressed relative to that of the outer cladding 34 and of the outer tube cladding 35 (see FIG. 2). Such a fiber is said to have a depressed inner cladding. As shown in FIG. 2, the core 30 has a diameter, d, and an index of refraction $n_c$, represented by a line 44 which has a relative refractive index difference $\Delta^+$ with respect to a reference line 45 corresponding to the index of refraction $n_t$ of the outer tube cladding 35 and expressed as a percentage of the index of refraction of the precursor tube. The inner cladding 32 has a diameter, D, and an index of refraction $n_{cli}$ which is represented by a line designated by the numeral 43 and which has a relative refractive index difference $\Delta^-$ with respect to the same reference line 45 expressed as a percentage of the index of refraction of the precursor tube. As mentioned hereinbefore, the overall difference in index of refraction from that of the core to that of the inner depressed cladding expressed as a percentage of the index of refraction of the precursor tube is designated $\Delta$.

Used are ratios of $\Delta^-/\Delta$ and $D/d$ which are appropriate to provide a cutoff wavelength which is substantially reduced from that of a matched cladding fiber with the same core size and overall refractive index difference. What is provided is a substantially microbending and macrobending insensitive fiber capable of operation in single mode fashion at a predetermined wavelength.

W-design optical fiber is known in the prior art. For example, see an article entitled "Low Loss Dual Window Single Mode Fibers With Very Low Bending Sensitivity" authored by B. J. Ainslie, et al. and published at page 317 in the IOOC-ECOC '85 Technical Digest. In the Ainslie article, for a reported W fiber, the height of the core refractive index above the inner dressed cladding expressed in terms of $\Delta$ is 0.0069.

It has been found that such a $\Delta$ value is insufficient to provide the bend resistance required for use in a tethered vehicle. Instead it has been found that a $\Delta$ of at least 0.009 is needed for such usage. Further, such fiber is characterized by a $\Delta^+$ of at least 0.6% for $\Delta^-$ equal to 0.3%. Of course, $\Delta^-$ could be increased as could $\Delta^+$. Desired is a larger $\Delta^-$ which means $\Delta^+$ can be smaller and there is less germanium in the core. As a result, the intrinsic loss is lower. The deeper the depression of the inner cladding in the refractive index profile, the better the mode power confinement. However, the manufacturing process limits the depth of it to about 0.3% to 0.4%.

The optical fiber of this invention is suitable for two windows of operation, one for a dual window of 1310 and 1550 and the second for the 1550 window only. For dual window operations, the optical fiber is characterized by a $\Delta^+$ of 0.9% and $\Delta^-$ is about 0.3%. For single window operation at 1550 nm, the optical fiber is characterized by a $\Delta^+$ of 0.6% and $\Delta^-$ is about 0.3%.

Beside optical requirements, high strength and long length are also important for fiber to be used in tethered vehicles. Long length implies that the new fiber design should allow for easy manufacture from a large preform. All these requirements are met by the optical fiber of this invention.

In a preferred embodiment, the radius of the depressed region is relatively small. The radius to an outer point "b" (see FIG. 2) of the depressed inner cladding is equal to the product of about 2.5 and the radius to the outer point "a" (see FIG. 2) of the core. For dual window operation, the radius to the outer point of the depressed inner cladding 32 is equal to the product of 2.5 and a number ranging from about 3.0 to 3.2 microns. For single window operation, the radius to the outer point of the depressed inner cladding is equal to the product of 2.5 and a number ranging from about 4 to 4.3 microns.

The signal rate of a tethered vehicle system may be no more than a few hundred MHz. Chromatic dispersion should not be a limiting factor to the system with appropriate laser diode transmitters. Again, depending on the system design, the fiber's cutoff wavelength requirement could either be less than 1300 nm for dual window systems or less than 1500 nm for use only at the 1500 nm window.

The combination of the diameter D of the inner cladding 32 and the index of refraction of the first outer cladding 34 are important insofar as cutoff wavelength is concerned. Although in a preferred embodiment, the first outer cladding has an index $n_{clo}$ represented by a line 47 which is within about 0.1% of the refractive index of the precursor silica tube, i.e. the reference refractive index, that index of the first outer cladding could be outside this range, if the diameter of the inner cladding were reduced. However, if the index of the outer cladding is too far outside the preferred range, the cutoff wavelength undesirably increases.

As the mode field diameter of the optical fiber of this invention increases, macrobending decreases. It would be expected that macrobending would increase. The reason for the decrease is the cutoff wavelength, $\lambda_c$. For matched cladding fiber, if the core size is increased, the cutoff wavelength is increased as well as the mode field diameter and micro and macrobending loss. But in the optical fiber of this invention, as the core size increases, $\lambda_c$ increases, mode field diameter increases, microbending increases, but macrobending decreases.

What is important is that $\Delta$ is at least 0.9% and the cutoff wavelength is less that 1500 nm. What is desired and what is accomplished with the W-design fiber of this invention is to contain the fundamental mode without containing the second order mode.

EXAMPLES

Preforms were made using the modified chemical vapor deposition (MCVD) technique, with silica tubes as the starting tubes. A slightly depressed cladding ($\Delta^- = 0.05\%$ with fluorine and phosphorous doping) region was deposited; then a high depressed region ($\Delta^- = 0.3\%$ with germanium and fluorine doping) was deposited adjacent to the core. Step index germanium doped cores with two different $\Delta^+$ values were made to study the effect on fiber loss and bending properties.

Figure 5:
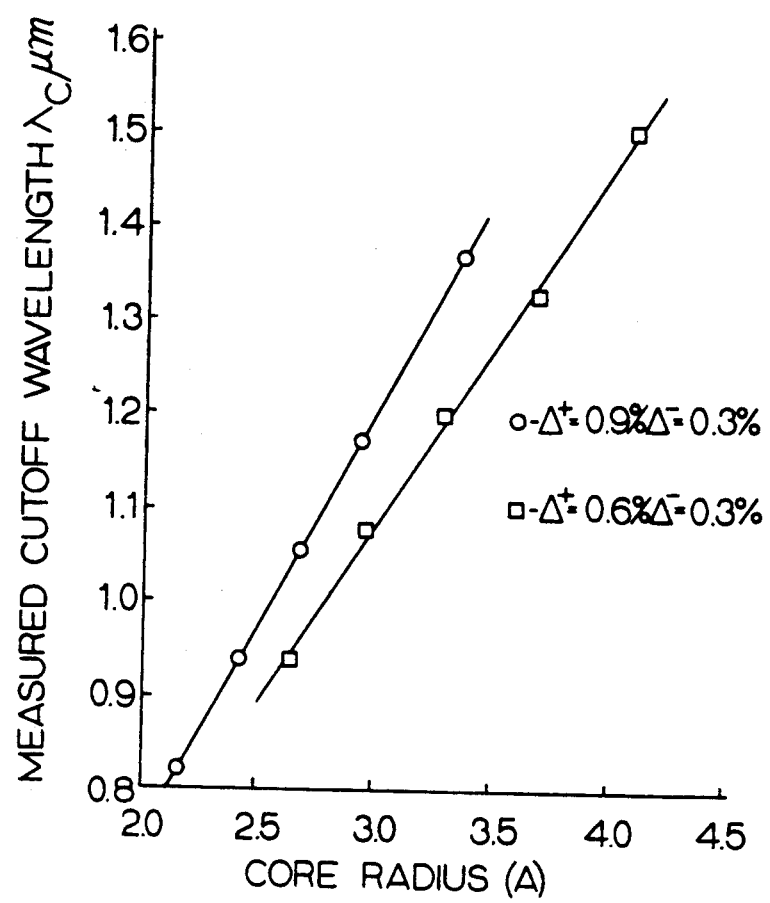
FIG. 5 is a graph which depicts cutoff wavelength versus core radius.

A graph of measured cutoff wavelength, $\lambda_c$, versus estimated core radius for two preforms is shown in FIG. 5. As can be seen, the cutoff wavelength increases linearly with core radius. The higher slope corresponds to a preform having the higher core index.

Figure 6:
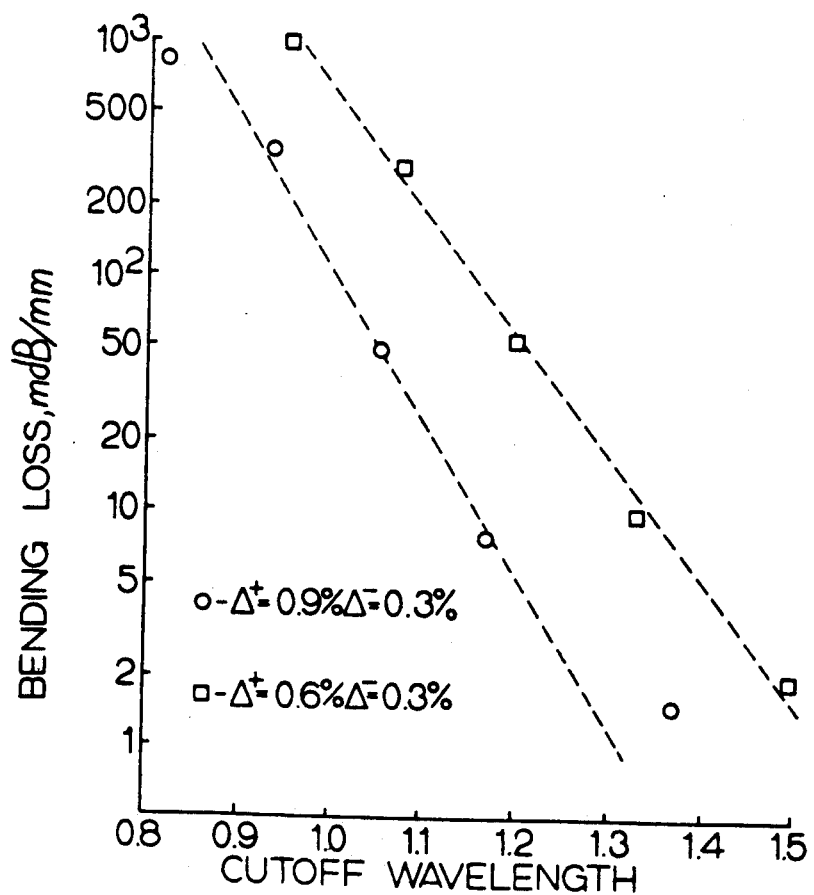
FIG. 6 is a graph depicting bending loss plotted as a function of cutoff wavelength.

Macrobending loss results at 1550 nm of ten spools of optical fiber, were carried out with a single loop loss test. As the cutoff wavelength approached 1550 nm, the bending performance improved significantly. The effect of the core index can be seen in FIG. 6 which shows 2 mm loop radius bending losses plotted against cutoff wavelength for fibers from two preforms. For the same cutoff wavelength, the fiber with the higher core index had lower bending loss. The advantage of the fiber of this invention is clear when it is compared with prior art commercially available fiber. With the same cutoff wavelength ($\lambda_c$ no greater than 1300 nm), fibers of this invention had lower bending loss than prior art fiber. Because both fibers have lower positive index $\Delta^+$ than some prior art fiber, a fiber which has bending performance similar to the prior art fiber, but lower initial loss, could be used. It also follows from this FIG. 6 that if the cutoff wavelength can be increased to 1500 nm, then core index $\Delta^+$ can be reduced still further to lower the initial loss while maintaining superior bending performance.

Superior bending performance of the optical fiber of this invention was also confirmed in a peel point simulation test. In this test, fiber was bent around a small diameter mandrel with a single 90° bend to simulate the actual payout condition from a tethered vehicle from a tethered vehicle. The losses induced by four different diameter bends at 1300 nm and 1550 nm for different fiber types were collected. The results showed that the W-fiber of this invention have a very low peel point loss. In general, a modified W-fiber can be used such that its peel point loss is in the range of one to three orders of magnitude less than prior art fibers.

Figure 7:
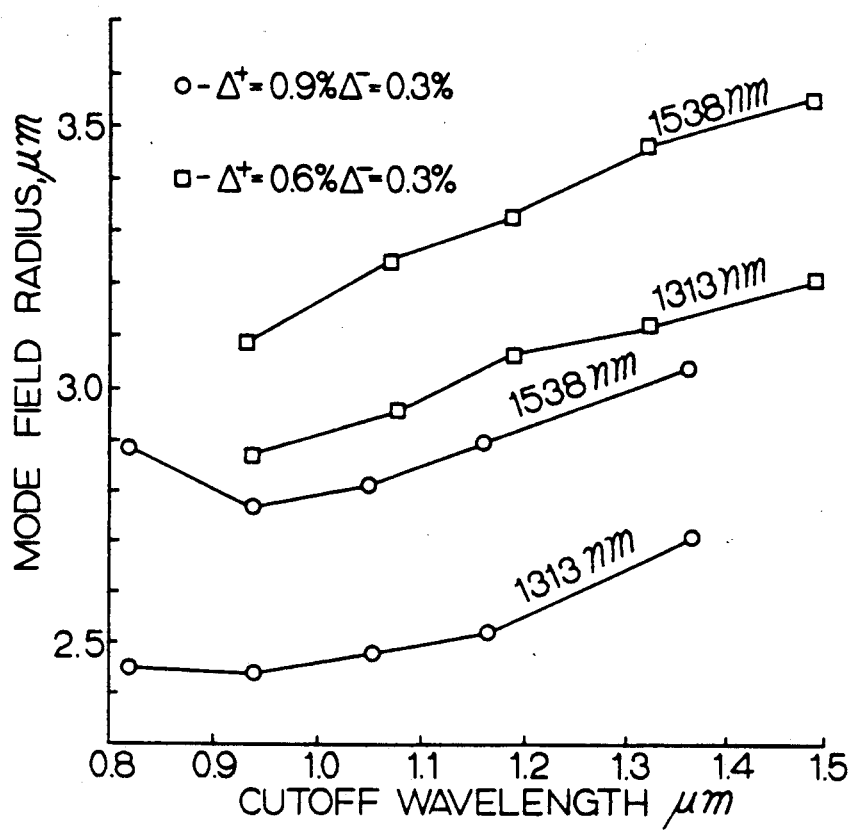
FIG. 7 is a graph which shows mode field radius plotted as a function of cutoff wavelength.

Measured Petermann II mode field radius at 1538 nm and 1313 nm are shown in FIG. 7. As the cutoff wavelength and core radius were increased, the mode field radius increased slightly. Comparing now FIGS. 6 and 7 it can be seen that bending loss decreased when cutoff wavelength increased. This indicates that for the W-fiber of this invention, a larger mode field radius results in better macrobending performance.

Figure 8:
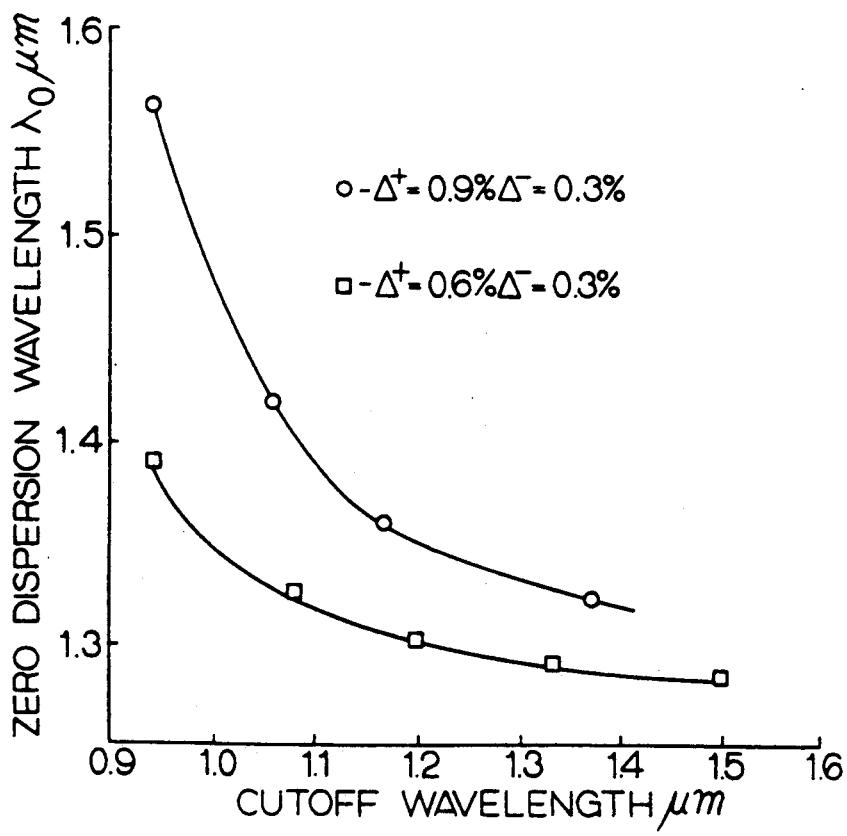
FIG. 8 is a graph showing zero dispersion wavelength versus cutoff wavelength.

The zero dispersion wavelengths of the W-fiber of this invention were found to be lower than other prior art fibers for the same cutoff wavelength. As shown in FIG. 8, for fiber drawn from the same preform, the zero dispersion wavelengths will decrease as cutoff wavelengths increase. These results are consistent with macrobending loss results. When cutoff wavelength increases, the fundamental mode power is more confined in the core region. This reduces waveguide dispersion and the zero dispersion wavelength approaches that of the core material. Consequently, dispersion at 1550 nm will increase as macrobending loss decreases.

It is to be understood that the above-described arrangements are simply illustrative of the invention. Other arrangements may be devised by those skilled in the art which will embody the principles of the invention and fall within the spirit and scope thereof.

I claim:

1. An optical fiber, which comprises:
   a core having a substantially circular cross section normal to a longitudinal axis of the fiber; and
   a cladding system adjacent to said core and having a substantially circular cross section normal to the longitudinal axis, said core and said cladding system being characterized by a W-shaped index of refraction profile with said cladding system including an inner depressed cladding, a first outer cladding and second outer cladding with the difference between the index of refraction of the core and the index of refraction of said inner depressed cladding being at least 0.9% of the index of refraction of said second outer cladding and with an outer diameter of said inner cladding being equal to the product of a number in the range of about two to four and the diameter of said core, said fiber being further characterized by a cutoff wavelength of less than 1500 nm.

2. An optical fiber having a modified W-shaped index of refraction profile and a circular cross section transverse to its longitudinal axis, said optical fiber comprising:
   a germanium doped core having an index of refraction; and
   an inner cladding being adjacent to the core and being down-doped to cause a refractive index thereof to be depressed from a reference index of refraction with the difference between the index of refraction of the core and the index of refraction of the inner depressed cladding expressed as a percentage of the reference index of refraction being at least 0.9%;
   a first outer cladding having an index which is within about 0.1% of the reference index of refraction; and
   a second outer cladding characterized by the reference index of refraction;
   an outer diameter of said inner cladding being in the range of about the product of two to four and the diameter of the core.

3. An optical fiber having a modified W-shaped index of refraction profile, said optical fiber having been drawn from a preform comprising a precursor silica tube in which deposits have been made and which has been collapsed into a rod, said optical fiber comprising:
   a germanium doped core having a substantially circular cross section normal to a longitudinal axis of said fiber and having an index of refraction of at least 0.6% in excess of a reference index of refraction of the precursor tube as measured in terms of a percentage of the reference index of refraction;
   an inner cladding being disposed adjacent to the core and having a substantially circular cross section normal to the longitudinal axis, being down-doped and being characterized by a refractive index which is depressed with respect to said reference index of refraction with the difference between the reference index and the index of said inner cladding being about 0.3% of the reference index of refraction, an outer diameter of the inner depressed cladding being in the range of about the product of two to four and the diameter of the core;
   a first outer cladding having an index which is within about 0.1% of the reference refractive index of the precursor silica tube; and
   a second outer cladding which is characterized by said reference index of refraction.

4. The optical fiber of claim 3, wherein said inner cladding is down-doped with boron.

5. The optical fiber of claim 4, wherein said inner cladding also is doped with a material which is selected from the group consisting of phosphorus and germanium.

6. The optical fiber of claim 3, wherein said inner cladding is down-doped with fluorine.

7. The optical fiber of claim 6, wherein said inner cladding also is doped with a material which is selected from the group consisting of phosphorus and germanium.

8. The optical fiber of claim 6, wherein a radius to an outer periphery of said inner cladding is equal about to the product of 2.5 and a number ranging from about 3.0 to 3.2 microns.

9. The optical fiber of claim 3, wherein said core is characterized by a $\Delta+$ of 0.9%.

10. The optical fiber of claim 9, wherein the core has a radius which is in the range of about 3.0 to 3.2 microns.

11. The optical fiber of claim 3, wherein said core is characterized by a $\Delta+$ of 0.6%.

12. The optical fiber of claim 11, wherein the core has a radius in the range of about 4.0 to 4.3 microns.

13. The optical fiber of claim 12, wherein the radius of the inner cladding equal is about the product of 2.5 and the core radius.

14. The optical fiber of claim 3, wherein the index of refraction profile of the core is stepped.

15. The optical fiber of claim 3, wherein the configuration of the index of refraction profile of the core is triangular.

16. The optical fiber of claim 3, wherein the configuration of the index of refraction profile of the core is graded.

* * * * *